No. 649,695. Patented May 15, 1900.
J. JACOBSON & G. JORANSON.
OVEN.
(Application filed Jan. 31, 1900.)
(No Model.)
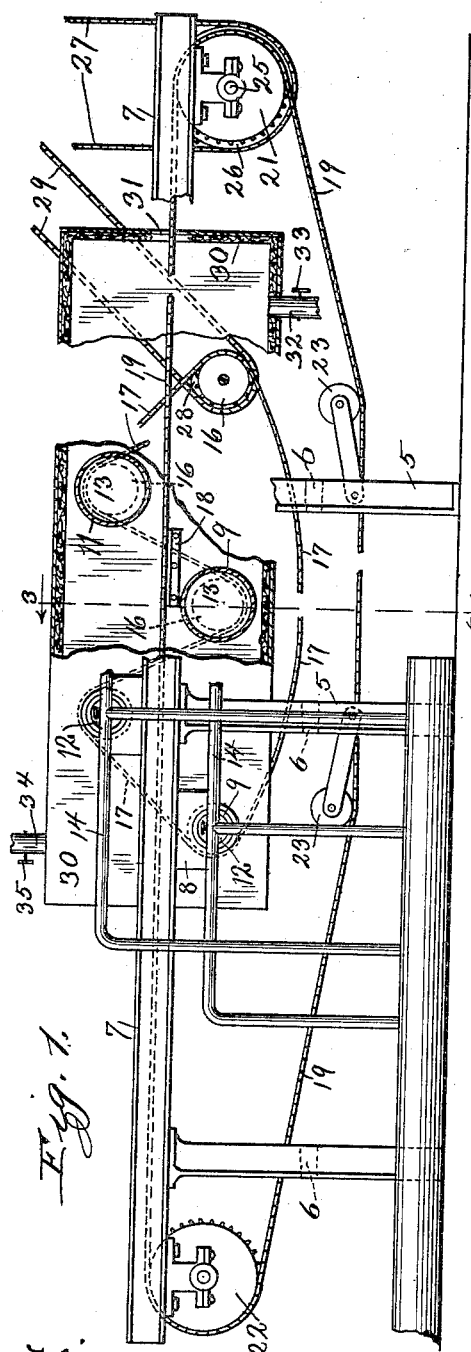
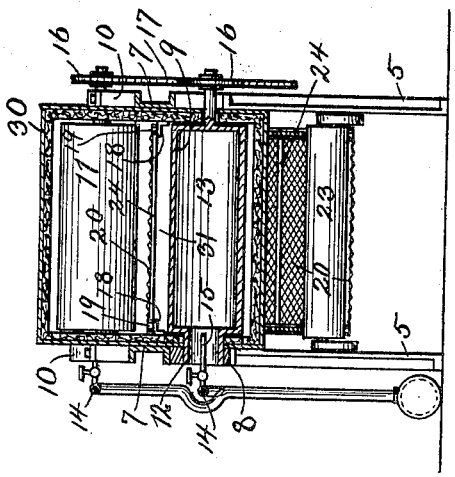
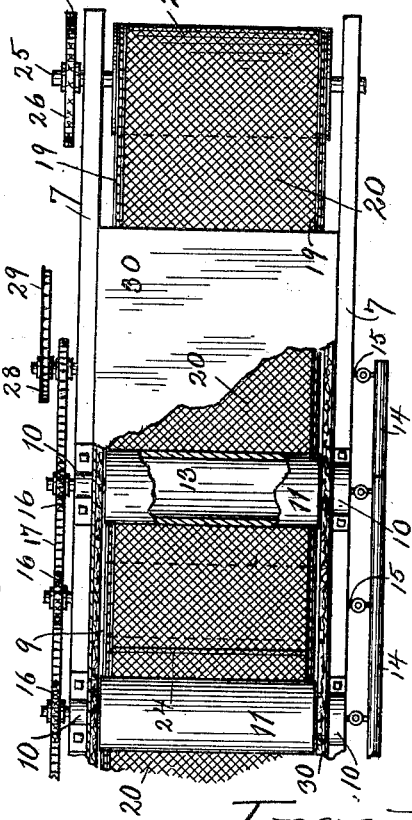
Witnesses:
R. J. Jacker,
J. D. Chubb.
Inventors
Jacob Jacobson
Gust J. Joranson

UNITED STATES PATENT OFFICE.

JACOB JACOBSON AND GUSTAF JORANSON, OF CHICAGO, ILLINOIS.

OVEN.

SPECIFICATION forming part of Letters Patent No. 649,695, dated May 15, 1900.

Application filed January 31, 1900. Serial No. 3,542. (No model.)

*To all whom it may concern:*

Be it known that we, JACOB JACOBSON and GUSTAF JORANSON, citizens of the United States, residing at Chicago, in the county of Cook and State of Illinois, have invented a new and useful Improvement in Ovens, of which the following is a specification.

Our invention relates to that class of ovens or driers in which the material to be baked or dried is moved through the oven by mechanical or other means. Heretofore it has been impossible or very difficult to obtain the heat at a given temperature on the upper side of the material to be baked, and when the heat is forced down from above by a current of air a large percentage of the heat is necessarily lost.

We construct our oven so that the heat is directed toward the material to be baked or dried from above as well as below, and this we accomplish without the use of a current of air, which necessarily cools the oven to a certain extent. We also arrange the burners for heating the oven so that each burner, whether it is located in the upper or lower side, front, or rear end of the oven, can be regulated independently of the others. The burners used are of any ordinary construction. We prefer using gas, it being the most convenient to handle. We place within an oven of sufficient length, whose ends are closed with the exception of a slot large enough to permit the passage therethrough of the material to be baked upon a moving perforated belt made of any incombustible material, two rows of hollow metallic rollers arranged one above the other, so that the belt carrying the material to be baked can pass between the two rows of rollers. One end of every roller is open, into which is admitted the flame from the burner, and by causing the rollers to be rotated we attain the desired effect of having all sides of the rollers of equal temperature. Thus it will be readily understood that by regulating the heat passing within any roller the heat radiating from that roller will be regulated, whether it be in the upper or lower row.

Referring to the drawings, in which similar numerals refer to similar parts in all the views, Figure 1 is a side elevation of our improved oven, partly in section. Fig. 2 is a fragmental plan view, and Fig. 3 is a cross-section on line 3 3 of Fig. 1.

Secured upon the supports 5, which are braced by the cross-pieces 6, are the longitudinal channel-irons 7, to which are secured the journal-boxes 8 for the lower rollers 9 and the journal-boxes 10 for the upper rollers 11. One end of the rollers 9 and 11 is open, as at 12, communicating with the hollow interior 13 of the rollers.

Arranged adjacent to the open ends 12 of the rollers are the gas-pipes 14, having communicating with them the burners 15, one of which is placed in the open end 12 of each roller 9 and 11. The other end of the rollers 9 and 11 carries a short shaft, to which is secured a sprocket-wheel 16, which are all engaged by the endless chain 17, as shown.

Fastened at convenient intervals on the inner face of the channel-irons 7 are the carrying-brackets 18, over which slide the chains 19, secured to either side of the endless perforated belt 20, passing over the driven roller 21 at the outlet end of the oven and the idler-roller 22 at the inlet end of the oven, returning beneath the oven, where we conveniently place the gravity-belt tighteners 23. We place at intervals the cross-bars 24 between the chains 19 to prevent the chains coming too close together, and thereby slipping off of the carrying-brackets 18.

Mounted upon the shaft 25 of the driven roller 21 is the sprocket-wheel 26, driven by a counter-shaft through the chain 27. Secured to one of the shafts on the rollers 11, adjacent to the sprocket-wheel 16, is the sprocket-wheel 28, driven by the chain 29. Inclosing the rollers 9 and 11 and fitting tightly around the journal-boxes 8 and 10 we construct the oven-casing 30, having the openings 31 on either end to permit the passage of the endless belt 20 and the material to be baked or dried. We prefer making this oven-casing of sheet metal, lined with some good non-conductor of heat.

On the lower side of and near one end of the oven we place the pipe 32, having the regulating-damper 33, and on the upper side of and near the other end of the oven we place the pipe 34, having the damper 35.

While we have shown the rollers 9 and 11 round, open only on one end, driven by a sprocket-chain arranged in two horizontal rows in a horizontal plane, and an endless belt for carrying the material to be baked or dried, we do not wish to be limited to this exact construction, but we may construct the oven with slight modification and still lie within the scope of our invention.

Having described our invention, what we claim, and desire to secure by Letters Patent, is—

1. The combination in a baking-oven of a series of hollow rollers, having one closed end and one open end, internally heated by introducing a flame into the open end thereof arranged above and below an endless carrier, but not in contact therewith, a means for rotating the rollers simultaneously and a means for driving the said belt, all arranged within a casing, substantially as and for the purpose specified.

2. In a baking-oven, the combination of a series of rotatable cylinders, the heads of which are respectively provided with solid and hollow journals, a means for conducting a flame into the cylinder through the hollow journals, a sprocket-wheel secured to each cylinder, engaging an endless chain, an endless carrier arranged to travel between the upper and lower row of cylinders, a means for driving the endless chain, and endless carrier, a casing inclosing the cylinders, having an elongated opening in each end, an air-inlet on the lower side, and an air-outlet on the upper side, all arranged substantially as described.

In testimony whereof we have signed our names to this specification in the presence of two subscribing witnesses.

JACOB JACOBSON.
GUSTAF JORANSON.

Witnesses:
J. D. CHUBB,
J. C. DAVIDSON.